United States Patent
Gonsalves et al.

(10) Patent No.: US 10,102,588 B1
(45) Date of Patent: Oct. 16, 2018

(54) SYSTEM AND METHOD OF UTILIZING RADIO BARS TO TAILOR COVERAGE OPTIONS FOR AN INSURANCE POLICY

(71) Applicant: STATE FARM MUTUAL AUTOMOBILE INSURANCE COMPANY, Bloomington, IL (US)

(72) Inventors: Mary Elizabeth Gonsalves, Normal, IL (US); Sunni Barbera, Evanston, IL (US); Chris Giesler, Elmhurst, IL (US); Aaron Shimer, Evanston, IL (US); Arturo Trovato, Chicago, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 476 days.

(21) Appl. No.: 14/812,115

(22) Filed: Jul. 29, 2015

Related U.S. Application Data

(60) Provisional application No. 62/087,463, filed on Dec. 4, 2014, provisional application No. 62/051,210, filed on Sep. 16, 2014.

(51) Int. Cl.
*G06Q 40/08* (2012.01)
*G06F 3/0484* (2013.01)

(52) U.S. Cl.
CPC ......... *G06Q 40/08* (2013.01); *G06F 3/04842* (2013.01)

(58) Field of Classification Search
None
See application file for complete search history.

(56) References Cited

U.S. PATENT DOCUMENTS

| 6,684,190 B1 * | 1/2004 | Powers | G06Q 40/06 705/36 R |
| 8,065,169 B1 * | 11/2011 | Oldham | G06Q 40/00 705/35 |

(Continued)

OTHER PUBLICATIONS

Progressive Auto Auto Insurance—Mobile, https://autoinsurance1.progressivedirect.com/RatePackage/Details, retrieved from the internet on Sep. 21, 2015, 4 pages, (1 of 2).

(Continued)

*Primary Examiner* — Narayanswamy Subramanian
*Assistant Examiner* — Christopher Bridges
(74) *Attorney, Agent, or Firm* — Marshall, Gerstein & Borun LLP; Randall G. Rueth

(57) ABSTRACT

In a method, a client device may be caused to provide an interactive display to the customer. The display may include controls usable by the customer to select different coverage combinations for a hypothetical policy, and an insurance premium quote for the hypothetical policy. Each control may enable the customer to adjust coverage for a different coverage type, be associated with a control graphic, and include a respective set of radio buttons distributed along a line within the control graphic. Each radio button may correspond to a different coverage level. The client device may also be caused to display, each time the customer adjusts a control by selecting a new radio button, a current selection indicator at the new radio button. The client device may also be caused to set, each time the customer selects a new coverage combination, the premium quote to a value corresponding to the new combination.

15 Claims, 5 Drawing Sheets

(56) References Cited

U.S. PATENT DOCUMENTS

| | | | |
|---|---|---|---|
| 8,073,714 B1* | 12/2011 | Ball | G06Q 10/10 705/35 |
| 8,626,538 B1* | 1/2014 | Kilpatrick, II | G06Q 40/08 705/4 |
| 8,706,531 B1* | 4/2014 | Voigt | G06Q 40/08 705/1.1 |
| 8,719,060 B1* | 5/2014 | Hopkins | G06Q 40/08 705/4 |
| 2013/0238368 A1* | 9/2013 | Willis | G06Q 40/08 705/4 |
| 2013/0268301 A1* | 10/2013 | Diefendorf | G06Q 30/02 705/4 |
| 2015/0178849 A1* | 6/2015 | Berger | G06Q 40/08 705/4 |
| 2015/0254754 A1* | 9/2015 | Lang | G06Q 30/0631 705/4 |

OTHER PUBLICATIONS

Progressive Auto Insurance—Mobile, https://autoinsurance1.progressivedirect.com/RatePackage/Details, retrieved from the internet on Sep. 21, 2015, 4 pages (2 of 2).

Progressive Auto Insurance—Mobile, Liability (BI/PD), https://autoinsurance1.progressivedirect.com/RatePackage/Editcoverage?cov=BIPD, retrieved from the internet on Sep. 21, 2015, 2 pages.

Progressive Comparison Rates, https://cre1.progressivedirect.com/AutoDisplayPage.aspx?ST=IL&Page=RatesPage, retrieved from the internet on Sep. 21, 2015, 2 pages.

Ul Spec Design (retrieved from Internet on May 9, 2014).

Timetable (retrieved from Internet on May 9, 2014).

Explore (retrieved from Internet on May 9, 2014).

National Geographic National Parks App (retrieved from Internet on May 9, 2014).

Progressive Website (retrieved from Internet on Sep. 21, 2015).

\* cited by examiner

SYSTEM AND METHOD OF UTILIZING RADIO BARS TO TAILOR COVERAGE OPTIONS FOR AN INSURANCE POLICY

CROSS-REFERENCE TO RELATED APPLICATIONS

This claims the benefit of U.S. Provisional Patent Application No. 62/051,210, entitled "System and Method of Utilizing Radio Bars to Tailor Coverage Options for an Insurance Policy" and filed on Sep. 16, 2014, and of U.S. Provisional Patent Application No. 62/087,463, entitled "System and Method of Utilizing Radio Bars to Tailor Coverage Options for an Insurance Policy" and filed on Dec. 4, 2014, the disclosures of which are hereby incorporated herein by reference in their entireties.

FIELD OF THE DISCLOSURE

The present disclosure generally relates to insurance and, more specifically, to systems and methods for providing customized insurance premium quotes to an existing or potential insurance policyholder/customer.

BACKGROUND

Increasingly, insurance companies/providers allow customers to obtain quotes for insurance policy premiums via the Internet. To obtain an on-line quote, a customer typically visits the insurance company web site and accesses an on-line form to enter information needed to calculate the appropriate premium amount (e.g., information about a property being insured and/or information about the customer). The customer may also select various coverage levels, such as limits and deductibles for different types of coverage (e.g., for auto insurance, a limit for bodily injury liability, a limit for property damage liability, a comprehensive deductible, a collision deductible, etc.), after which a premium for the selected combination of coverage levels is displayed to the customer.

Often, however, customers may wish to see how the policy premium will be impacted as various coverage levels are changed. Thus, a customer may manually select a first coverage combination (set of coverage levels) and view the premium for such a policy. After which, the customer may select a different, second coverage combination (e.g., by adjusting one or more deductibles and/or coverage limits), and then view the new premium for that policy.

Unfortunately, the process of using conventional on-line quote tools with a large number of options may be ponderous and time consuming, and may generally result in a poor user experience for customers. For example, interacting with numerous drop-down menus or pop-up windows to select different coverage levels may cause the customer to quickly lose track of the context associated with a currently displayed premium and coverage combination. In particular, the customer may forget how the currently selected coverage combination relates to his or her coverage under a current policy, forget how the currently selected coverage combination relates to the full range of available coverage options, and so on. This may cause customer confusion and/or make the customer less certain as to the desirability of a particular coverage combination, cause customer frustration, and/or generally reduce the benefit that the on-line tools provide to the customer.

BRIEF SUMMARY

The present embodiments may, inter alia, improve the customer experience by providing a user interface that allows customers to better understand how each of their coverage decisions affects their insurance policies and premiums, which may in turn reduce the time, effort and/or difficulty of identifying insurance coverage combinations that are tailored to the customers' individual preferences or needs.

In one aspect, a computer-implemented method may include causing, by one or more processors, a client device of an existing or potential customer/policyholder to provide an interactive display to the customer. The interactive display may include (i) a plurality of controls usable by the customer to select different ones of a plurality of coverage combinations for a hypothetical insurance policy, and (ii) an insurance premium quote for the hypothetical insurance policy. Each control of the plurality of controls may (i) enable the customer to adjust coverage for a respective one of a plurality of coverage types, (ii) be associated with a respective one of a plurality of control graphics, and/or (iii) include a respective set of radio buttons distributed along a line within the respective control graphic. Each radio button in the respective set of radio buttons may correspond to a different coverage level available for the respective one of the plurality of coverage types. The method may also include causing, by one or more processors, the client device to display, each time that the customer adjusts one of the plurality of controls by selecting a new radio button of the respective set of radio buttons, a current selection indicator at the new radio button. The method may also include causing, by one or more processors, the client device to set, each time that the customer selects a new coverage combination of the plurality of coverage combinations, the insurance premium quote to a value that corresponds to the new coverage combination to facilitate virtually adjusting an insurance quote and ease of viewing a virtual representation or depiction of those adjustments. The method may include additional, fewer or alternative actions, such as any of those discussed elsewhere herein.

In another aspect, a tangible, non-transitory computer-readable medium stores instructions that may, when executed by one or more processors, cause the one or more processors to cause a client device of an existing or potential customer to provide an interactive display to the customer. The interactive display may include (i) a plurality of controls usable by the customer to select different ones of a plurality of coverage combinations for a hypothetical policy, and (ii) an insurance premium quote for the hypothetical policy. Each control of the plurality of controls may (i) enable the customer to adjust coverage for a respective one of a plurality of coverage types, (ii) be associated with a respective one of a plurality of control graphics, and/or (iii) include a respective set of radio buttons distributed along a line within the respective control graphic. Each radio button in the respective set of radio buttons may correspond to a different coverage level available for the respective one of the plurality of coverage types. The instructions may also cause the one or more processors to cause the client device to display, each time that the customer adjusts one of the plurality of controls by selecting a new radio button of the respective set of radio buttons, a current selection indicator at the new radio button. The instructions may also cause the one or more processors to cause the client device to set, each time that the customer selects a new coverage combination of the plurality of coverage combinations, the insurance premium quote to a value that corresponds to the new coverage combination. The non-transitory computer-readable medium may store instructions that direct the one or more processors to perform additional, less or alternative functionality, such as any of the functionalities discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

DETAILED DESCRIPTION

The present embodiments relate to accepting virtual adjustments to insurance policies and/or quotes for insurance, such as virtual adjustments entered by a user using a display or display screen of a mobile or other computing device. The virtual adjustments to the insurance policies and/or quotes for insurance may include a user wanting to see the impact of one or more changes in insurance policy options on an insurance policy premium, rate, discount, etc. The insurance policy options may include coverage levels, limits, and/or deductibles. In one embodiment, the insurance policy options may include different insurance coverages and/or coverage amounts for different insurance types and products. As the user virtually adjusts the combination of insurance policy options via interacting with a display screen, the insurance policy premium, rate, and/or discount may be updated. Simultaneously, a virtual depiction of previous insurance policy options that were previously or initially presented, considered, and/or selected may also be displayed or virtually depicted or represented to facilitate user comparison and/or analysis of different combinations of insurance policy options and/or associated pricing.

In one aspect, quote customization may allow users to tailor aspects of a quote to their specific needs and wants while educating them to the effects that their decisions have on their policy. To afford that interaction, the present embodiments may provide a user interface that allows users to explore their coverage options and model the effects on their premium. The optimal customer experience may include: (1) allowing users to see where the coverage originally defaulted to, what adjustments they have made, and/or what other coverage options are available; (2) illustrate a spectrum of options that visually represents the scale of those options; and/or (3) give customers the ability to explore a number of options together (or at once/simultaneously) to see the total affect while making changes to each and/or several of the options.

Figure 2:
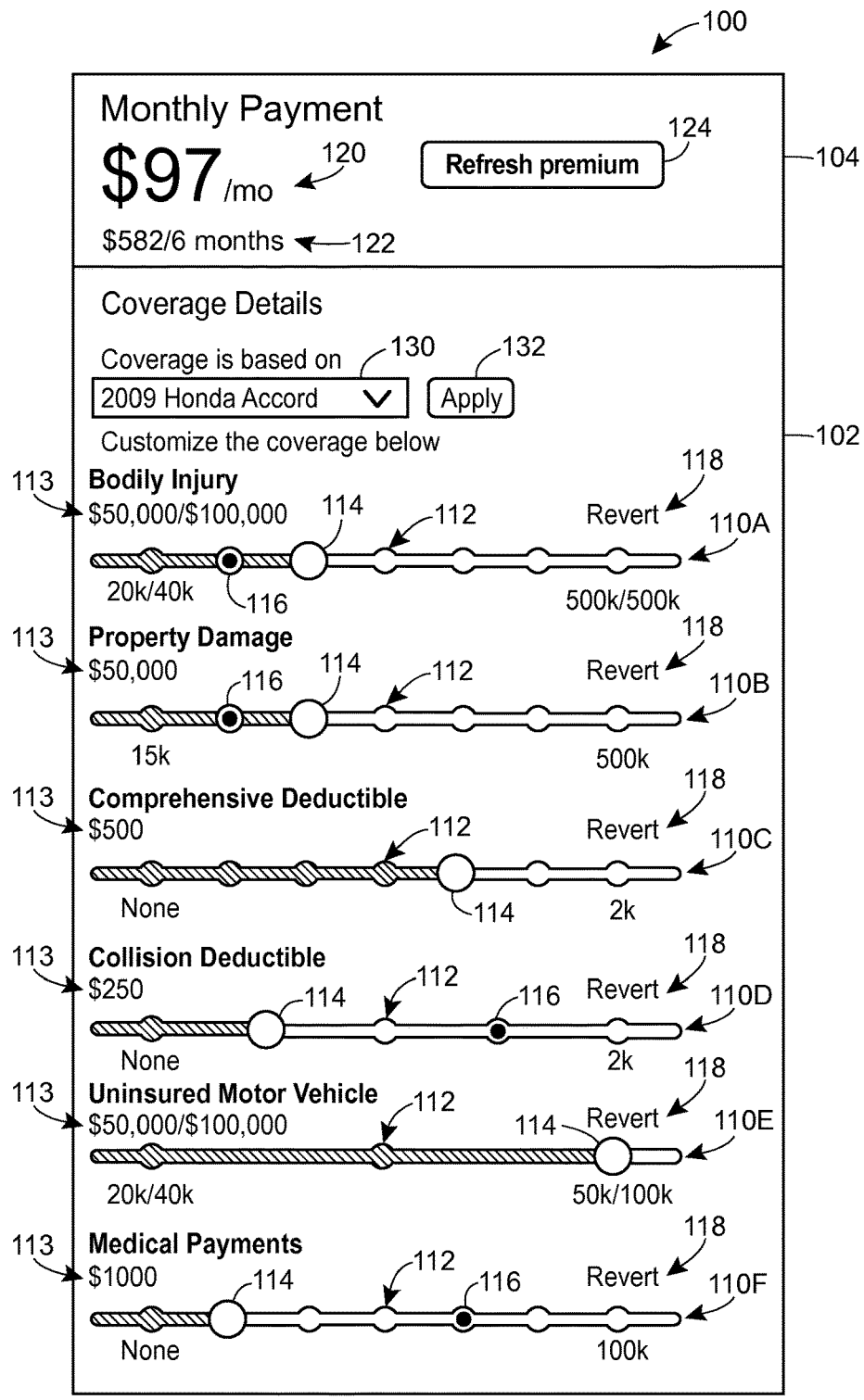
FIG. 2 depicts an exemplary interactive display that may be used by a customer to obtain insurance premium quotes for different coverage combinations, according to an embodiment.

In one embodiment, a mobile device may be caused to provide an interactive display to the customer. The display may include virtual controls (such as buttons, menus, slide bars, icons, horizontal bars (such as shown in FIG. 2), etc.) usable by the customer to select different coverage combinations for a hypothetical insurance policy, and a resulting insurance premium quote for the hypothetical insurance policy may be updated and displayed. Each control may enable the customer to adjust coverage for a different coverage type and/or insurance policy option (such as coverages/limits related to (1) bodily injury, (2) property damage, (3) comprehensive deductible, (4) collision deductible, (5) uninsured motorist, and/or (6) medical payments for an auto insurance policy (as depicted by FIG. 2)).

Further, each control may also be associated with a control graphic, and/or include a respective set of radio buttons or other icons distributed along a line within the control graphic. Each radio button or other icon may correspond to a different coverage level. The mobile device may also be caused to display, each time the customer adjusts a control by selecting a new radio button or other icon, a current selection indicator at the new radio button or icon. The mobile device may also be caused to set, each time the customer selects a new coverage combination, the premium quote to a value corresponding to the new combination, and then display the updated quote.

In another aspect, the design solution may include a radio bar design. The radio bar design may (a) create or facilitate a mobile-first/touch-friendly design alternative to a drop down menu; (b) help the user visualize their selections as a group of related options (e.g., coverages) that add-up and affect a sum/quantity (e.g., premium amount); (c) provide context by exposing or displaying the allotted range of options; and/or (d) afford a virtual "modeling" user interface interaction by combining the precision of a radio button with the interaction of a slider. The radio bar design may include additional, fewer, or alternative functionalities, including those discussed elsewhere herein.

I. Exemplary Insurance Premium Quotes Via an Improved User Interface

The present embodiments relate to providing insurance premium quotes to an existing or potential customer/policyholder. The hypothetical insurance policy for which the quotes are provided may be a home insurance policy, a condominium insurance policy, a vehicle insurance policy, and/or a personal property insurance policy, for example, and may represent a modified version of an actual, existing policy of the customer, or an entirely new policy. As used herein, and unless otherwise required by the context of the usage, the terms "customer" and "policyholder" may be used interchangeably, and may generally refer to either an existing customer/policyholder (e.g., an individual seeking a quote for a change to an existing policy) or a potential customer/policyholder (e.g., an individual seeking a quote for an entirely new policy).

In some embodiments and scenarios, the customer may seek a quote for an insurance policy, and may begin the quote request process by using a personal computer, a mobile device (such as a tablet, a phablet, a smartphone, laptop, pager, computing device, smart glasses, smart bracelet, smart watch, etc.), or any other suitable computing device with communication capabilities to provide the insurance provider with personal/demographic information about the customer (e.g., gender, birth date, etc.) and/or information relating to property of the customer (e.g., location, contents and/or construction of a home or condominium to be insured, a make, model and year of a vehicle to be insured, etc.). Alternatively, the insurance provider may already records of the customer's information (e.g., if the customer already has a policy with the insurance provider).

A server of the insurance provider may cause the customer's mobile or other computing device to provide the customer with an interactive display (e.g., by way of the server providing scripting language instructions of a web page to the customer's web browser application). The interactive display may include a set of interactive controls that enable the customer to adjust coverage levels of the hypothetical insurance policy. For example, one control may enable the customer to adjust a property damage liability coverage limit of the hypothetical policy, another control may enable the customer to adjust a comprehensive deductible of the hypothetical policy, and so forth. In some embodiments, the interactive display may also enable the customer to remove certain types of coverage entirely (e.g., by setting an associated coverage limit to zero, or by un-checking a box associated with the coverage type, etc.).

To help the customer visualize how his or her coverage selections interact with each other and affect the premium, and/or to make the user interface interactions generally more enjoyable, the controls for adjusting coverage levels may have various characteristics. For example, each of one or more of the controls on the interactive display may be associated with a control graphic that has the appearance of a slider control (e.g., a horizontal line with an indicator at the current setting), but with a number of discrete radio buttons that are distributed along a length of the control graphic and each correspond to a different available coverage level. By combining the feel/perception of using a slider with the precision of radio buttons, user satisfaction may be increased. To enhance the slider-like feel of the control, the control may allow the user to mouse-click on (or touch) the indicator of the current selection, drag the indicator to (or near) a new radio button, and then release the mouse button (or stop touching the screen) to select a new radio button and the corresponding coverage level. Alternatively, the control may only, or also, be responsive to the customer clicking on (or touching) a new radio button to select the new radio button and corresponding coverage level.

Each control may include a different radio button for each coverage level that is available for the corresponding coverage type (e.g., bodily injury limits, comprehensive deductible, etc.) in order to show the customer the full range of available coverage options. An indicator may show the currently selected radio button (e.g., an enlarged circle covering the selected radio button, etc.), and text may display the dollar amount(s) of the coverage level corresponding to the selected radio button (e.g., "$50,000/$100,000" for individual/total bodily injury limits). Moreover, if the customer is a current policyholder, a separate indicator may be shown at the radio button that corresponds to the coverage level currently in effect for the customer (e.g., a black dot within that radio button), which may help the customer visualize how his or her current selection relates to the coverage of his or her current policy.

One or more of the controls on the interactive display may also incorporate additional features that may help the customer visualize his or her coverage settings. For example, for each of one or more of the controls, highlighting may be added to a portion of the slider-like line included the control graphic (e.g., for a horizontal line/slider, highlighting starting at the left end of the line and extending to the right up to the currently selected radio button), and/or the color and/or shade of the highlighting may gradually transition along the length of the line (e.g., for a horizontal line/slider, blue at the left end and transitioning towards green at the right end if the right-most radio button is selected, or some intermediate blue-green color if neither the left-most or right-most radio button is selected).

The interactive display may also include other controls. For example, each of one or more of the slider-like controls for adjusting coverage levels may be accompanied by an additional control that, if selected by the customer, causes the corresponding slider-like control to revert to its original value (e.g., to the coverage level in effect under the customer's current policy). As another example, the interactive display may include an additional control that causes all of the slider-like controls to revert to their original values. As yet another example, the interactive display may include an additional control that allows the customer to request a premium quote for the coverage combination that is currently selected (e.g., the coverage combination corresponding to the current state of the slider-like controls). When the customer requests the premium by activating such a control, the interactive display may show the quoted premium, as determined based upon the currently selected coverage combination and the customer's information (e.g., demographic and/or property information, claims history, etc.). Alternatively, the premium shown on the interactive display may be updated substantially in real-time as the customer adjusts each slider-like control.

Some or all of the features of the interactive display described above, and/or elsewhere herein, may provide one or more of various advantages. For example, customers may be able to better visualize and understand how their coverage choices for a new policy will affect their premiums, and/or how changes to current coverage will (or may) cause their premiums to change from current levels. Moreover, customers may more quickly grasp the spectrum of coverage options available to them. As a result, customers may more quickly and/or accurately identify a desired coverage level, leading to less frustration and a higher likelihood of the customer seeking insurance through the provider offering the premium quote tool.

II. Exemplary Environment for Providing Insurance Premium Quotes

Figure 1:
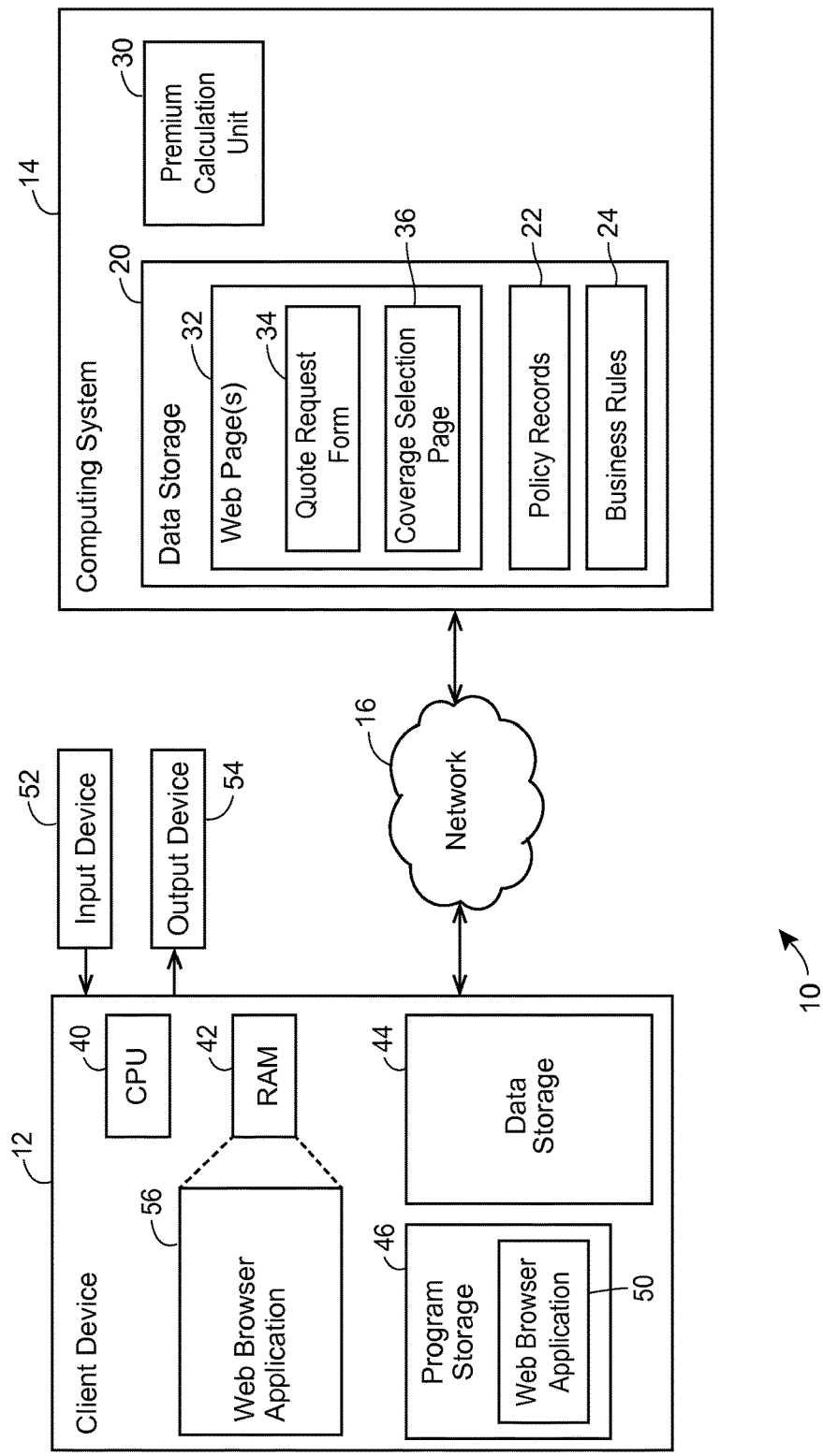
FIG. 1 depicts an exemplary environment including components associated with providing a user interface for exploring coverage options for an insurance policy, according to an embodiment.

FIG. 1 depicts an example environment 10 that may include components associated with providing insurance premium quotes to a customer in a user-friendly manner, according to an embodiment. As illustrated in FIG. 1, the environment 10 may include a client device 12 and a computing system 14. The computing system 14 may include one or more servers of an insurance provider, such as a home, condominium, vehicle, and/or personal property insurance company, for example. The user of client device 12 may be a customer of the insurance provider, for example. In the example environment 10, computing system 14 may be communicatively coupled to client device 12 via a network 16. Network 16 may be a single communication network, or may include multiple communication networks of one or more types (e.g., one or more wired and/or wireless local area networks (LANs), and/or one or more wired and/or wireless wide area networks (WANs) such as the Internet).

Computing system 14 may include a data storage 20, which may include one or more types of persistent memory. Data storage 20 may store policy records 22, which may contain policyholder information for customers having existing policies, and/or policyholder information for customers who do not yet have existing policies but have entered the information in order to obtain a quote. The policyholder information may include, for each customer, personal/demographic information, such as gender, birth date, etc., of the customer, and/or information about property of the customer (e.g., information about the property to be insured, such as location, constructions and/or contents of a home, and/or make, model and year of a vehicle, etc.). Data storage 20 may also store business rules 24, which may define which coverage types and/or levels, and which combinations of coverage types and/or levels, can be assigned to a policy. For example, the business rules 24 may specify which values and combinations of deductibles, coverage limits and/or other policy parameters (e.g., types and durations of riders, etc.) are allowed for a policy. To provide a more specific example relating to automobile insurance, the business rules 24 may specify that a policy must include at least some minimum amount of property damage liability insurance if the policy does not have at least some threshold level/limit of uninsured motor vehicle coverage. The allowable values/combinations for a particular policy may be dependent to some extent on the policyholder information (e.g., personal information and property-related information entered by the policyholder), or may be independent of the policyholder information, in different embodiments and/or scenarios.

The computing system 14 may also include a premium calculation unit 30. Generally, in an embodiment, premium calculation unit 30 may use the policyholder information in policy records 22, and a desired set of coverage combinations (e.g., sets of deductibles and coverage limits), to calculate premiums for hypothetical policies for quoting purposes. In some embodiments, premium calculation unit 30 may be the same unit that is used by the insurance provider to calculate actual premiums that are billed out for existing policies. In an embodiment, premium calculation unit 30 may be (or includes) a set of one or more computing devices or processors. Alternatively, premium calculation unit 30 may be a component of software that is stored as instructions on a computer-readable medium (e.g., a random access memory (RAM) and/or read-only memory (ROM) of computing system 14) and executed by one or more processors of computing system 14 to calculate premiums.

Data storage 20 may also store one or more web pages 32, which may include HyperText Markup Language (HTML) instructions, JavaScript instructions, JavaServer Pages (JSP) instructions, and/or any other type of instructions suitable for defining the content and presentation of the web page(s) 32. The web page(s) 32 may include a "home page" of the insurance provider that acts as an initial entry point for customers, for example, as well as one or more additional pages that may be navigated to find various kinds of information relating to the services/products of the insurance provider.

Within at least one of the web page(s) 32 may be a quote request form 34, which may include a number of fields requesting information from the individual seeking the quote. For example, the quote request form 34 may include fields requesting personal/demographic information (e.g., name, gender, birth date, etc.), and/or fields requesting information relating to a property to be insured (e.g., a home address, a type of construction of a residence, whether a home has an active alarm system installed, a make, model and year of a vehicle, etc.). The quote request form 34 may conform to a particular file format (e.g., PDF, XML-based, HTML, etc.), and may include instructions that both define the content and presentation of the form and support/define interactive features provided by the form. For example, the quote request form 34 may include instructions that define a plurality of fields in which a customer may enter information, the location of the fields within the form display, the text/descriptors associated with the fields, rules for valid entries within one or more of the fields, messages to be displayed next to the fields in response to detecting invalid entries, and so on. The quote request form 34 may also include instructions for performing various "form-level" actions, such as submitting the form to a remote server (e.g., posting information entered in the form fields to a server of computing system 14), electronically signing the form, printing the form, etc.

Also included within at least one of web page(s) 32 may be a coverage selection page 36, which may provide an interactive display with a number of interactive controls for adjusting policy parameters such as deductible levels, coverage limits/levels, and/or other suitable parameters defining a hypothetical policy, as well as a premium quote. The coverage selection page 36 may comprise HTML, JavaScript, JSP or other scripting language instructions that define the appearance, location, text descriptors and/or functionality of the interactive controls and the premium quote, for example. One example of a display that may be provided by the coverage selection page 36 is shown in FIG. 2, which will be discussed below.

In an alternative embodiment, web page(s) 32 may include references to quote request form 34 and/or coverage selection page 36, and quote request form 34 and/or coverage selection page 36 may be stored in a different data storage not shown in FIG. 1, and/or at a different computing system not shown in FIG. 1.

While many customers and client devices may access web page(s) 32, for clarity FIG. 1 illustrates only the example client device 12 of a single customer. As illustrated in FIG. 1, client device 12 may include a central processing unit (CPU) 40 to execute computer-readable instructions, a RAM 42 to store the instructions and data during operation of programs, a data storage 44 that may include persistent memory to store data used by the programs executed by CPU 40, and a program storage 46 that may include persistent memory to store the programs/instructions executed by CPU 40, including, for example, a web browser application 50. By way of example, the data storage 44 and/or the program storage 46 may be implemented on a hard disk drive coupled to CPU 40 via a bus (not shown in FIG. 1). More generally, the components 40, 42, 44 and 46 may be implemented in any suitable manner according to known techniques. Client device 12 may be a mobile device (such as a smart phone, tablet, phablet, laptop, pager, PDA (personal digital assistant), smart watch or bracelet, smart glasses, wearable electronics, etc.), personal computer (e.g., desktop), or any other suitable stationary or portable computing device, including computing devices configured for wired or wireless communication. While client device 12 in the example of FIG. 1 may include both storage and processing components, client device 12 may instead be a so-called "thin" client that depends upon another computing device for certain computing and/or storage functions. For example, data storage 44 and/or program storage 46 may be external to client device 12 and connected to client device 12 via a network link.

Further, client device 12 may be coupled to an input device 52 that allows the customer to enter inputs to client device 12, and an output device 54 that allows the customer to view outputs/displays generated by client device 12. The input device 52 may be a pointing device such as a mouse, keyboard, trackball device, digitizing tablet or microphone, for example. The output device 54 may be a display monitor, for example. In one embodiment, input device 52 and output device 54 may be integrated as parts of a single device (e.g., a touch screen device). Using the input device 52 and the output device 54, a customer may be able to interact with graphical user interfaces (GUIs) provided by the client device 12.

When CPU 40 executes the web browser application 50, RAM 42 may temporarily store the instructions and data required for its execution. In FIG. 1, the web browser application 50 being executed is represented in the program space of RAM 42 as web browser application 56. When the customer uses the web browser application 56 to access the quote request form 34 or coverage selection page 36 of web page(s) 32, for example, the quote request form 34 or coverage selection page 36, respectively, may be stored as a local copy (not shown in FIG. 1) in RAM 42, and the web browser application 56 may interpret the instructions of the local copy to present the form/page to the customer and allow the customer to interact with the form/page.

In operation, a customer using client device 12 may use the web browser application 56 to access, via network 16 (e.g., the Internet), web page(s) 32 of the computing system 14. By navigating to the appropriate one of web page(s) 32, the customer may then select (e.g., click on) a reference to the quote request form 34. The computing system 14 may then retrieve the quote request form 34 (e.g., from an insurance form database not shown in FIG. 1) and make the quote request form 34 available to the customer via web browser application 56. When interpreting the instructions of the quote request form 34, the web browser application 56 may cause output device 54 to display the quote request form 34 (e.g., the fields, text, etc. of quote request form 34) to the customer, and enable the customer to enter form field information via input device 52. In some embodiments, the web browser application 56 may use a plug-in, an extension and/or another software component that extends the functionality of the web browser application 56 (e.g., a PDF reader plug-in) in order to display the quote request form 34 to the customer, and/or to allow the customer to interact with the quote request form 34. Once the customer enters the requested information in the quote request form 34 (e.g., personal/demographic information and/or property information, as discussed above), and submits the information (e.g., by using web browser application 56 to post the information to a server of computing system 14), the information may be stored in policy records 22 as a part of a record specific to that customer.

In one embodiment, the computing system 14 may automatically cause the web browser application 56 to access the coverage selection page 36 after the customer has completed and submitted the quote request form 34. Alternatively, the customer may be required to navigate to the coverage selection page 36, or the coverage selection page 36 may be made available to the customer in another suitable manner. As discussed above, the coverage selection page 36 may provide an interactive display with a number of interactive controls for adjusting policy parameters (e.g., deductible levels, coverage limits/levels, and/or other parameters defining a hypothetical policy), as well as an indication of a premium quote. Once the coverage selection page 36 is displayed to the customer via output device 54, the customer may use the input device 52 to adjust the interactive controls as he or she sees fit. Premium calculation unit 30 may calculate premiums corresponding to the coverage combinations reflected in the settings/states of the interactive controls (e.g., as the controls are adjusted or, alternatively, each time a refresh/update button or other control is activated by the customer), and computing system 14 may send the calculated premiums to client device 12 for storage in data storage 44 and display on output device 54 (e.g., display within the coverage selection page 54). The interaction/timing between the customer adjusting the interactive controls and the premium calculation unit 30 calculating premiums, according to various different embodiments, is discussed further below in connection with FIG. 2.

In an alternative embodiment, the customer may obtain insurance premium quotes using a downloaded software component (e.g., a software component that is downloaded and stored in program storage 46) rather than a web page accessed via web browser application 56. For example, client device 12 may be a smartphone of the customer, and program storage 46 may store a smart phone application that was previously downloaded from a server of computing system 14 via network 16. For example, the application may generate a form similar to the quote request form 34, and post the entered policyholder information to a server of computing system 14. The application may also, or instead, generate an interactive display similar to that provided by coverage selection page 36, and cause the client device 12 to request premiums from computing system 14 as described above.

As can be seen from the above discussion, the components in the environment 10, when using the above techniques, may drastically shorten the time required to complete an insurance process, such as obtaining an insurance quote, at least in part by enabling a customer to quickly and accurately determine a preferred level of coverage. As such, the resource usage or consumption of the components in the environment 10 (e.g., in the computing system 14 and/or the client device 12) during the quote process for the customer/applicant may be greatly reduced. For example, the customer may need to cycle through fewer iterations when changing policy parameters, thereby causing the number of processor cycles utilized by the computing system 14 and/or the client device 12 to be greatly reduced. Further, fewer iterations of policy parameter changes may result in fewer values (e.g., fewer coverage settings, fewer premiums, etc.) being stored locally (e.g., at the data storage 44 and/or RAM 42).

III. Exemplary Interactive Display for Obtaining Insurance Premium Quotes

FIG. 2 depicts an exemplary interactive display 100 that may be used by a customer to obtain insurance premium quotes for different coverage combinations, according to an embodiment. The interactive display 100 may be provided by a web page accessed by a customer, such as the coverage selection page 36 of FIG. 1, for example. Alternatively, the interactive display 100 may be generated and presented by a software application executing on a mobile device, such as a smartphone, tablet, or phablet, and/or other computing device of a customer.

FIG. 2 depicts the interactive display 100 as it might appear within a display of a window or web browser (e.g., a web browser provided by web browser application 56 and displayed on output device 54 of FIG. 1), for example. It is understood that the interactive display 100 is just one example corresponding to one field of insurance (i.e., automobile insurance). In other embodiments and/or scenarios, the interactive display 100 may instead include coverage types corresponding to other types of insurance policies (e.g., a home insurance policy, a condominium insurance policy, etc.), and/or may include more, fewer and/or different types of policy parameters than are shown in FIG. 2. The interactive display 100 may be responsive to touch control by the customer, which may be particularly desirable if the customer is accessing the interactive display 100 using a smart phone or other mobile device. Alternatively, the interactive display 100 may be responsive to other actions, such as mouse clicks and mouse movement, touching a touch pad on a lap top computer, etc.

The interactive display 100 may include a coverage selection area 102 and a premium display area 104. The coverage selection area 102 may include controls 110A through 110F (collectively, "controls 110") each corresponding to a different coverage type (e.g., a particular policy limit, a particular policy deductible, etc.). In the embodiment shown in FIG. 2, for example, the controls 110 may include a bodily injury limit control 110A, a property damage limit control 110B, a comprehensive deductible control 110C, a collision deductible control 110D, an uninsured motor vehicle limit control 110E, and/or a medical payment limit control 110F. Each of the controls 110 may include a control graphic having a slider-like appearance and extending in a horizontal line across a portion of the interactive display 100, as shown in FIG. 2. Alternatively, one or more of the controls 110 may include a control graphic extending in a vertical line across a portion of the interactive display 100.

Each of the controls 110 may include a number of radio buttons 112 distributed along (e.g., evenly distributed along) the length/line of the respective control graphic, as is also shown in FIG. 2. The various controls 110 may all have the same number of radio buttons 112 or, as in the example of FIG. 2, may include some controls that have different numbers of radio buttons 112. Each of the controls 110 may have a different radio button 112 for each different permissible setting. For example, business rules 24 of FIG. 1 may specify the number of coverage levels available for each coverage type (bodily injury limit, property damage limit, etc.), and instructions of the coverage selection page 36 may access that information to ensure that each of the controls 110 has exactly one different radio button 112 for each permissible coverage level. Business rules 24 may also specify the dollar amounts associated with each coverage level, and the coverage selection page 36 may access that information to ensure that a correct coverage amount 113 is displayed for each of the controls 110. Each coverage amount 113 may correspond to the current setting/state of the respective one of the controls 110, and the current setting/state may be indicated by an indicator 114 on the respective control graphic. The indicator 114 may be a circular icon placed over the currently selected radio button 112, for example, or may be any other suitable type of indicator (e.g., a color or shade used to fill in the radio button 112, a rectangular icon placed over the radio button 112, etc.).

In some embodiments and scenarios where the customer is a current policyholder, each of the controls 110 may have an initial, default setting corresponding to the coverage of a current policy of the customer. In other embodiments and/or scenarios, each of the controls 110 may have a different initial setting (e.g., the left-most radio button 112 for each of the controls 110, the right-most radio button 112 for each of the controls 110, etc.).

In various different embodiments, the controls 110 may be adjusted in different ways. For example, the customer may adjust one of the controls 110 by clicking or tapping (e.g., with a left mouse button or finger) on the respective indicator 114 and dragging the indicator 114 to cover (or, in some embodiments, to at least be within the vicinity of) the desired new radio button 112. Alternatively, or additionally, the customer may adjust one of the controls 110 by directly clicking on or tapping the desired new radio button 112. In either case, the indicator 114 may then move to (e.g., be displayed at, and only at) the selected radio button 112.

In some embodiments, the graphic for each of one or more of the controls 110 may also incorporate other dynamic features that a customer may find useful for visualizing the context of changes and/or settings. For example, the long axis of each control graphic (e.g., in FIG. 2, the horizontal line passing through the radio buttons 112) may be displayed differently depending upon the current setting for the corresponding one of the controls 110. The line may have a thickness/width that is shaded to appear darker along the entire length of the line up to the indicator 114, for example, and/or may have a thickness/width that is colored differently up to the indicator 114. The color and/or shading may gradually and smoothly transition from one color/shade at the end associated with the lowest setting (e.g., the left-most end in the example of FIG. 2), to another color/shade at the end associated with the highest setting (e.g., the right-most end in FIG. 2), with more of the colored/shaded portion being revealed as the customer selects a radio button 112 corresponding to a higher setting/amount. Referring to the bodily injury limit control 110A (where the indicator 114 is currently at the third of the seven radio buttons 112), for example, the line of the control graphic may appear blue at the left-most end and gradually transition towards green until, at the location of the indicator 114, the line is a blue-green color that is approximately 43% (~3/7) of the way between blue and green.

As another example, referring to the uninsured motor vehicle limit control 110F (where the indicator 114 is currently at the third of the three radio buttons 112), the line of the control graphic may appear blue at the left-most end and gradually transition towards green until, at the location of the indicator 114, the line is entirely green. In other embodiments, the colors and/or shades of the control graphic lines may not transition along the line lengths, or the control graphic lines may not be colored and/or shaded at all.

To allow the customer to visualize which coverage types have been changed using controls 110, and to visualize the degree to which the coverage levels have been changed, one, some or all of the controls 110 may also include an indicator 116 that corresponds to the coverage in a current insurance policy of the customer. The indicator 116 may be a dot or circle within the radio button 112 that corresponds to the current policy coverage level, for example, or may be any other suitable type of indicator (e.g., a color or shade used to fill in the appropriate radio button 112, a "C" or shape icon placed over the appropriate radio button 112, etc.).

In some embodiments, the indicator 116 may not be shown when the indicator 114 is currently on the radio button 112 where the indicator 116 would otherwise appear (e.g., where the currently selected radio button corresponds to the current policy coverage level, as shown for the comprehensive deductible limit control 110C and the medical payments limit control 110F of FIG. 2). In other embodiments, the indicator 116 may appear on a single radio button 112 simultaneously with indicator 114.

One, some or all of the controls 110 may also be associated with a respective "revert" control 118 that, when activated by the customer, causes the respective one of the controls 110 to change back to the setting that corresponds to the coverage under a current policy of the customer. If the customer were to activate (e.g., click on or touch) the revert control 118 associated with control 110A, for example, the control 110A may be automatically adjusted to the coverage level that corresponds to the second of the seven radio buttons 112 for the control 110A. As another example, if the customer were to activate the revert control 118 associated with control 110D, the control 110D may be automatically adjusted to the coverage level that corresponds to the fourth of the five radio buttons 112 for the control 110D. As yet another example, if the customer were to activate the revert control 118 associated with control 110C, the control 110C may not be adjusted at all, because the current setting already corresponds to the coverage under the current policy.

The premium display area 104 of the interactive display 100 may include a premium quote 120 and a total premium 122. In the example of FIG. 2, the premium quote 120 may be a monthly payment amount, and the total premium 122 shows a corresponding bi-annual amount. In other embodiments, however, the premium quote 120 and/or the total premium 122 may be for any other suitable time period(s), and/or the total premium 122 may be omitted. In one embodiment, the premium quote 120 may update to reflect the current settings/state of all of the controls 110A-110F only when the customer activates an update control 124. Thus, in this embodiment, the premium quote 120 may not change each time a single one of the controls 110 is adjusted, and may not always correspond to the coverage combination reflected by the current settings of the controls 110A-110F.

In an alternative embodiment, however, the premium quote 120 may update to reflect the current settings/state of all of the controls 110A-110F substantially in real-time as the customer adjusts each one of the controls 110. For example, the premium quote 120 may change as soon as the customer changes the control 110A (e.g., as soon as the customer clicks on or touches a new radio button 112, or as soon as the customer releases the mouse button, or stops touching the screen, after dragging the indicator 114 to the location of the new radio button 112, etc.). In these latter embodiments, the update control 124 may be omitted.

The premiums displayed at premium quote 120 may be retrieved in various different manners, and from various different sources, in different embodiments. In one embodiment, for example, the premiums may be retrieved from a memory of the customer's computing device, such as data storage 44 of client device 12 in FIG. 1. Alternatively, the premiums may be received directly from a server of the insurance provider. Referring again to FIG. 1, for example, activation of the update control 124 may cause client device 12 to send a quote request to computing system 14, where the premium calculation unit 30 may determine the appropriate premium (e.g., based upon data in the quote request indicating the current settings of the controls 110A-110E, and based upon information about the customer and/or the customer's policy stored in policy records 22). Computing system 14 may then send, communicate, or transmit the premium back to client device 12 for display to the customer as the updated premium quote 120, for example.

The interactive display 100 may also include (e.g., in the coverage selection area 102) a policy selection control 130 that allows the customer to select a particular property and/or policy (e.g., a policy for a particular vehicle) for which coverage, or a change to coverage, is desired. Once the policy and/or property is/are selected, an "apply" control 132 may be activated by the customer (e.g., clicked on or touched by the customer) to cause all of the controls 110A-110E to automatically adjust to the settings that correspond to the selected policy and/or property. In the scenario of FIG. 2, for example, activating the apply control 132 a single time may cause control 110A to change to the second of its radio button 112, control 110B to change to the second of its radio buttons 112, control 110C to remain at the fifth of its radio buttons 112, control 110D to change to the fourth of its radio buttons 112, control 110E to remain at the third of its radio buttons 112, and/or control 110F to change to the fifth of its radio buttons 112.

In still other embodiments, the interactive display 100 may include one or more additional controls and/or display one or more additional kinds of information. For example, the interactive display 100 may include display area in which the customer may expand information about a covered property (e.g., information describing a vehicle and/or vehicle usage information), information about the customer or another individual (e.g., another driver on the customer's policy), discount information, and so on. As another example, the interactive display 100 may include an additional control that enables the customer to preview a policy having the selected coverage, to proceed with purchasing or changing a policy corresponding to the selected coverage, etc.

In some embodiments and/or scenarios (e.g., when displayed in a small window), the interactive display 100 may not all be visible to the customer at once, and the customer may need to adjust the display to see various portions thereof (e.g., by using vertical and/or horizontal scroll bars not shown in FIG. 2). In one embodiment where vertical scroll bars may be used, the premium display area 104, or a portion thereof (e.g., just premium quote 120 and/or update control 124), may have a fixed position within the display (e.g., at the top of the display) as the user scrolls up or down.

IV. Exemplary Premium Display Area

Figure 3A:
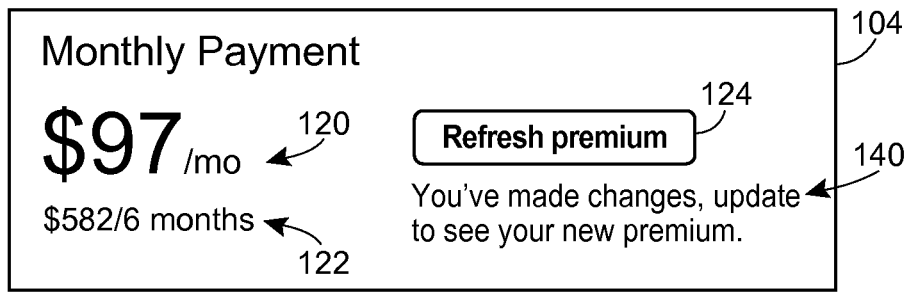
FIGS. 3A-3C depict the premium display area of the exemplary interactive display of FIG. 2 in various scenarios, according to an embodiment.
Figure 3B:
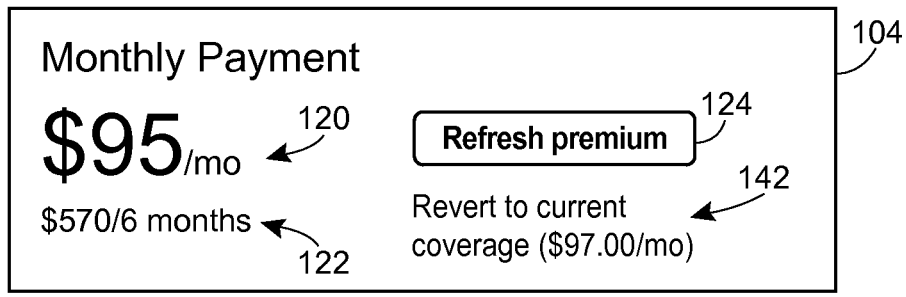
Figure 3C:
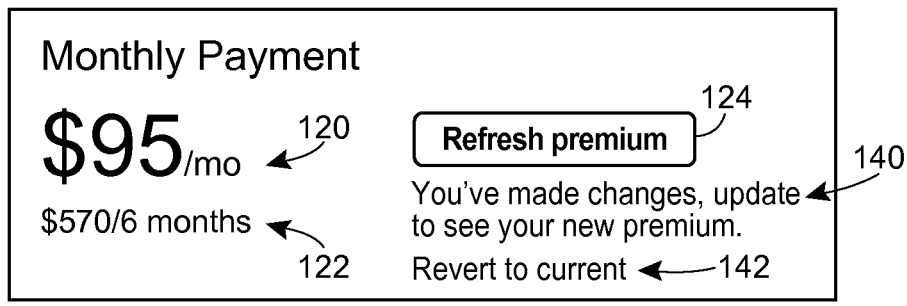

FIGS. 3A-3C depict the premium display area 104 of the example interactive display 100 of FIG. 2 in various different scenarios, according to one embodiment in which the premium 122 may be updated in response to the customer activating the update control 124. First, FIG. 3A depicts the premium display area 104 in a scenario where the customer has changed one or more coverage levels using one or more of the controls 110, but has not yet updated the premium 120 by activating the update control 124. In response to the customer changing a coverage level by adjusting one of the controls 110, a message 140 may be displayed in the premium display area 104. The message 140 may indicate that coverage change(s) has/have been selected, but is/are not yet reflected in the premium 120 and the total premium 122.

FIG. 3B depicts the premium display area 104 at a later time, in a scenario where the customer has proceeded to update the premium 120 by activating (e.g., clicking on or touching) the update control 124. In response to the customer activating the update control 124, the premium 120 and the total premium 122 may be updated to correspond to the current state/settings of the controls 110, and a "revert" control 142 may be displayed in the premium display area 104. The revert control 142 may appear as a message indicating that activation of the revert control 142 will cause all of the controls 110 to return to default coverage levels (e.g., levels corresponding to a current insurance policy of the customer), and/or indicating the premium corresponding to those coverage levels. Alternatively, the revert control 142 may appear as a button or other type of control. If activated (e.g., clicked on or touched), the revert control 142 may cause all of the controls 110 to return to the default (e.g., current policy, or an initial or original quote) coverage levels.

FIG. 3C depicts the premium display area 104 at a still later time, in a scenario where the customer has proceeded to again change one or more coverage levels. In response to the customer changing a first coverage level (e.g., adjusting one of the controls 110) after having updated the premium quote 120, the message 140 may again be displayed in the premium display area 104, but now along with the revert control 142. Alternatively, the message 140 may change to a new, similar message (e.g., "You've made additional changes, update to see your new premium," etc.), and/or the message associated with revert control 142 may change to a new, similar message (e.g., simply "Revert to current" as shown in FIG. 3C).

It is understood that, in other embodiments, the premium display are 104 may not change in the manner shown in FIGS. 3A-3C. For example, the message 140 and/or the revert control 142 may be omitted, or may have a different appearance and/or functionality. As another example, in an embodiment where the premium quote 120 and total premium 122 are updated substantially in real-time as each one of controls 110 is adjusted, the update control 124 and the message 140 may be omitted.

V. Exemplary Process Flow for Providing Insurance Premium Quotes to a Customer

Figure 4:
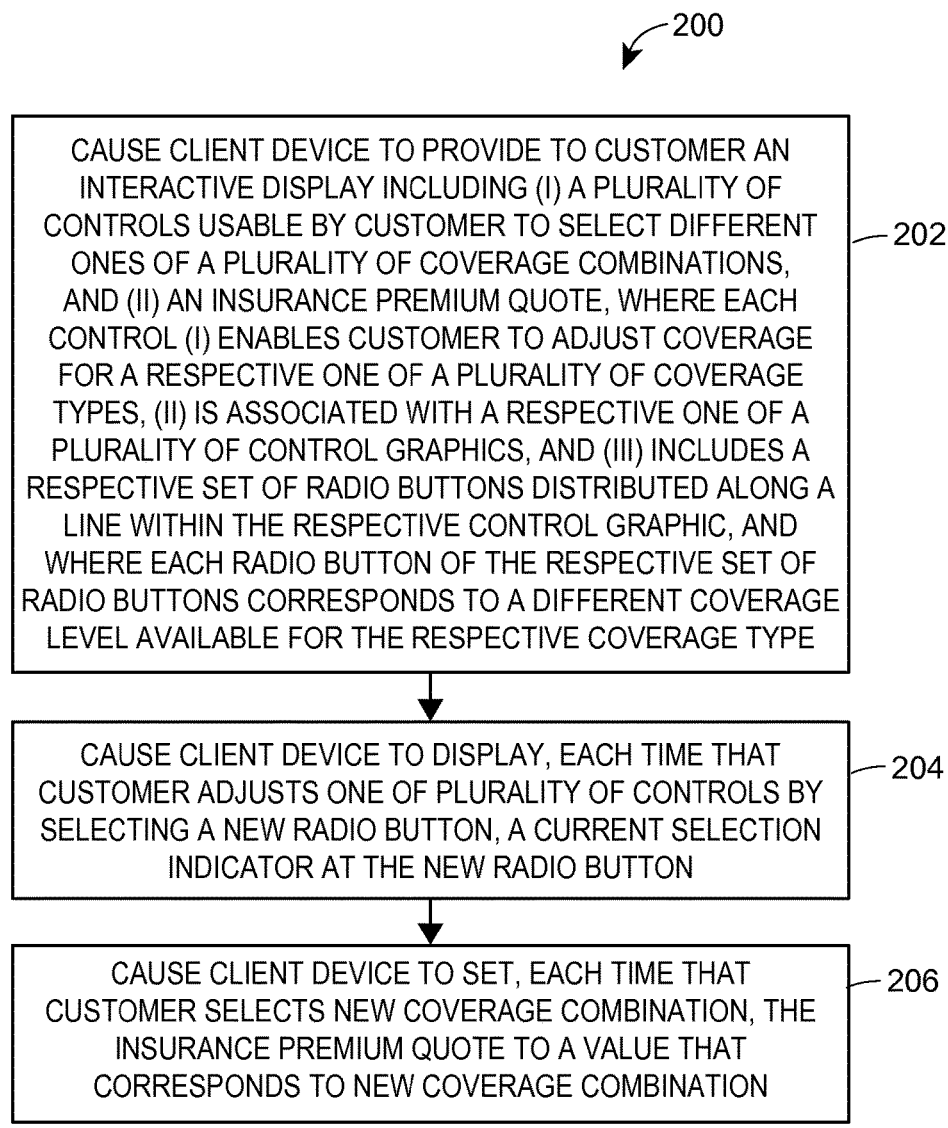
FIG. 4 depicts a flow diagram of an exemplary method for providing insurance premium quotes to a customer, according to an embodiment.

FIG. 4 depicts a flow diagram of an exemplary method 200 for providing insurance premium quotes to a customer in a user-friendly manner, according to an embodiment. In one embodiment, the method 200 may be implemented in (e.g., performed by one or more processors of) a server or other computer device of a computing system, such as a server within computing system 14 of FIG. 1, for example.

In the exemplary method 200, a client device of a customer may be caused to provide an interactive display to the customer (block 202). The interactive display may include a plurality of controls that are usable by the customer to select different ones of a plurality of coverage combinations for a hypothetical policy. The hypothetical policy may be a modified version of a current policy of the customer (e.g., if the customer is a current policyholder), or an entirely new policy (e.g., if the customer is a future/potential policyholder, or a current policyholder wanting to model a different type of policy), for example. The interactive display may also include an insurance premium quote for the hypothetical policy. The interactive display may look similar to the example interactive display 100 of FIG. 2, for example. The interactive display may be provided on a touch screen of the client device (e.g., such that the plurality of controls are touch screen controls), or on any other suitable type of display of the client device, and the client device may be a mobile device (e.g., a smart phone) or any other suitable computing device.

Each control of the plurality of controls may enable the customer to adjust coverage for a respective one of a plurality of coverage types (e.g., bodily injury limit, property damage limit, comprehensive deductible, collision deductible, etc.). Each control may also be associated with a respective one of a plurality of control graphics (e.g., similar to the control graphics associated with the controls 110 shown in FIG. 2), and may include a respective set of radio buttons distributed along a line within the respective control graphic. Each control graphic may extend over perpendicular long and short axes, for example, with a line connecting the radio buttons being situated along the long axis. Each radio button in the respective set of radio buttons may correspond to a different coverage level available for the respective one of the plurality of coverage types (e.g., no coverage, no deductible, $200 deductible, $500 deductible, $10,000/$50,000 individual/total coverage limit, etc.). The set of radio buttons for each of the plurality of controls may include a different radio button for every coverage level available for the coverage type associated with that control (e.g., such that there exists exactly one radio button per available coverage level in each control), for example.

The client device may also be caused to display, each time that the customer adjusts one of the plurality of controls by selecting a new radio button of the respective set of radio buttons (i.e., a new one of the radio buttons associated with the adjusted control), a current selection indicator at the new radio button (block 204). The current selection indicator may appear at the new radio button (and no longer appear at the old radio button) in response to the customer clicking on or touching the new radio button, for example, or in response to the customer "dragging" the selection indicator from the old radio button to the new radio button. The current selection indicator may be a circular icon overlaying the new radio button (e.g., as shown in FIG. 2), for example, or any other suitable type of indicator. In some embodiments and scenarios where the customer is a current policyholder, and where the selected new radio button does not correspond to a coverage level of the customer's current insurance policy, the client device may also be caused to display a current coverage indicator at a radio button that corresponds to the coverage level of the current policy (e.g., a black dot within the radio button, as shown in FIG. 2, or any other suitable type of indicator).

In addition to the current selection indicator (and possibly a current coverage indicator), the client device may be caused to highlight all radio buttons starting at a radio button closest to a first (e.g., left) end of the line within the respective control graphic, and ending at the new radio button. In addition to (or instead of) highlighting the radio buttons themselves, a continuous length of the line within the respective control graphic may be highlighted, with the continuous length extending at least between the radio button closest to the first end of the line and the new radio button. The continuous length may transition in a gradual, continuous manner from a first color at the first end of the line to a second color at the other end of the line (e.g., blue to green, or blue to an intermediate, blue-green value if the new radio button is not the right-most radio button, etc.), for example. Alternatively, the continuous length may not transition in color at all, and/or may transition in shading.

The client device may also be caused to set, each time that the customer selects a new coverage combination of the plurality of coverage combinations, the insurance premium quote to a value that corresponds to the new coverage combination (block 206). The customer may "select" the new coverage combination in various different ways according to different embodiments. For example, the customer may select the new coverage combination by adjusting one or more of the plurality of controls to reflect the new coverage combination, and then requesting that the quote be provided (e.g., by activating an additional control similar to update control 124 of FIG. 2). As another example, the customer may select the new coverage combination by virtue of adjusting a single control of the plurality of controls. In this latter embodiment, the premium quote may update substantially in real-time as each individual control is adjusted.

The client device may be caused to provide the interactive display at block 202, to display the current selection indicator at the new radio button at block 204, and/or to set the insurance premium quote to the value corresponding to the new coverage combination at block 206 by providing JSP or other scripting language instructions to a web browser application of the client device, for example. Alternatively, the client device may be caused to perform these operations by providing a downloadable software component (e.g., a smart phone application) to the client device, or in another suitable manner.

The method 200 may also include one or more additional blocks not shown in FIG. 4. For example, the method 200 may include a block in which the client device is caused to provide, for each control of the plurality of controls, an additional control (e.g., one of the revert controls 118 of FIG. 2) that, when activated by the customer, causes the control to automatically adjust to reflect a coverage level of a current insurance policy held by the customer. As another example, the method 200 may include a block in which the client device is caused to provide an additional control (e.g., the revert control 142 of FIGS. 3B and 3C) that, when activated by the customer, causes the plurality of controls to automatically and collectively adjust such that the plurality of controls reflects coverage levels of a current insurance policy held by the customer.

Figure 5:
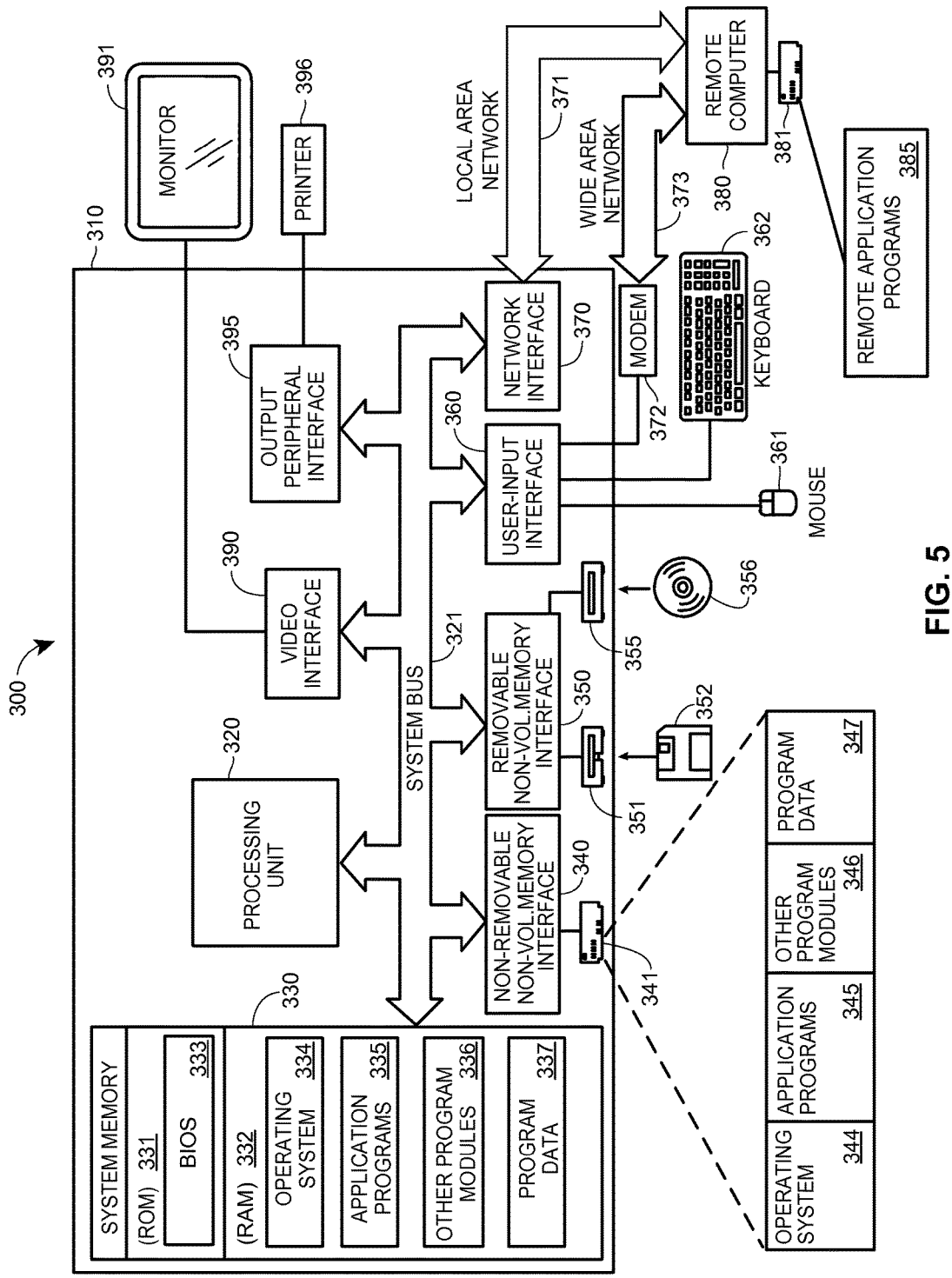
FIG. 5 depicts an exemplary computer system in which the techniques described herein may be implemented, according to an embodiment.

VI. Exemplary Computer System for Providing Insurance Premium Quotes to a Customer FIG. 5 depicts an example computer system 300 in which the techniques described herein may be implemented, according to an embodiment. The computer system 300 of FIG. 5 includes a computing device in the form of a computer 310. Components of the computer 310 may include, but are not limited to, a processing unit 320, a system memory 330, and/or a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may typically include a variety of computer-readable media. Computer-readable media can be any available media that can be accessed by computer 310 and includes both volatile and nonvolatile media, and both removable and non-removable media. By way of example, and not limitation, computer-readable media may comprise computer storage media and communication media. Computer storage media may include volatile and nonvolatile, removable and non-removable media implemented in any method or technology for storage of information such as computer-readable instructions, data structures, program modules or other data.

Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media may typically embody computer-readable instructions, data structures, program modules or other data in a modulated data signal, such as a carrier wave or other transport mechanism, and include any information delivery media. The term "modulated data signal" means a signal that has one or more of its characteristics set or changed in such a manner as to encode information in the signal. By way of example, and not limitation, communication media may include wired media, such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory, such as read only memory (ROM) 331 and random access memory (RAM) 332. A basic input/output system 333 (BIOS), containing the basic routines that help to transfer information between elements within computer 310, such as during start-up, may be typically stored in ROM 331. RAM 332 may typically contain data and/or program modules that are immediately accessible to, and/or presently being operated on, by processing unit 320. By way of example, and not limitation, FIG. 5 illustrates operating system 334, application programs 335, other program modules 336, and program data 337.

The computer 310 may also include other removable/non-removable, volatile/nonvolatile computer storage media. By way of example only, FIG. 5 illustrates a hard disk drive 341 that may read from or write to non-removable, nonvolatile magnetic media, a magnetic disk drive 351 that may read from or write to a removable, nonvolatile magnetic disk 352, and an optical disk drive 355 that may read from or write to a removable, nonvolatile optical disk 356, such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 5 may provide storage of computer-readable instructions, data structures, program modules and other data for the computer 310. In FIG. 5, for example, hard disk drive 341 is illustrated as storing operating system 344, application programs 345, other program modules 346, and program data 347. Note that these components may either be the same as or different from operating system 334, application programs 335, other program modules 336, and/or program data 337. Operating system 344, application programs 345, other program modules 346, and/or program data 347 may be given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device may also be connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 5. The logical connections depicted in FIG. 5 may include a local area network (LAN) 371 and a wide area network (WAN) 373, and may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may typically include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 5 illustrates remote application programs 385 as residing on memory device 381.

The techniques for providing insurance premium quotes described above may be implemented in part or in their entirety within a computer system such as the computer system 300 illustrated in FIG. 5. The computer 310 may be a mobile or client device of a customer (e.g., client device 12 of FIG. 1), and the remote computer 380 may be a server device associated with the insurance provider (e.g., within computing system 14 of FIG. 1), for example. In some such embodiments, the LAN 371 may be omitted (e.g., communications may between computer 310 and computer 380 may only occur via WAN 373). Application programs 335 and 345 may include a web browser application (e.g., web browser application 50 and 56 of FIG. 1), for example.

Remote computer 380 may provide an on-line form to computer 310, and/or receive from computer 310 the policyholder information entered in the on-line form, as discussed above, for example. As another example, remote computer 380 may cause the computer 310 to provide an interactive display (e.g., interactive display 100 of FIG. 2) to the customer by sending web page instructions or a downloadable software component via WAN 373, calculate the insurance premiums using a unit similar to premium calculation unit 30 of FIG. 1, and/or send the calculated premiums to computer 310 via WAN 373. The computer 310 may display the on-line form and/or the interactive display to the customer via monitor 391, and/or receive adjustments to the interactive controls from the customer via mouse 361 and/or keyboard 362, for example.

VII. Exemplary Method Embodiments

In one aspect, a computer-implemented method may include causing, by one or more processors, a client device of an existing or potential customer to provide an interactive display to the customer. The interactive display may include (i) a plurality of controls usable by the customer to select different ones of a plurality of coverage combinations for a hypothetical insurance policy, and/or (ii) an insurance premium quote for the hypothetical insurance policy. Each control of the plurality of controls may (i) enable the customer to adjust coverage for a respective one of a plurality of coverage types, (ii) be associated with a respective one of a plurality of control graphics, and/or (iii) include a respective set of radio buttons distributed along a line within the respective control graphic. Each radio button in the respective set of radio buttons may correspond to a different coverage level available for the respective one of the plurality of coverage types. For example, the respective set of radio buttons may include a different radio button for every coverage level available for the respective one of the plurality of coverage types. The method may also include causing, by one or more processors, the client device to display, each time that the customer adjusts one of the plurality of controls by selecting a new radio button of the respective set of radio buttons, a current selection indicator at the new radio button. The method may also include causing, by one or more processors, the client device to set, each time that the customer selects a new coverage combination of the plurality of coverage combinations, the insurance premium quote to a value that corresponds to the new coverage combination. The method may include additional, fewer or alternative actions, such as any of those discussed elsewhere herein.

For instance, if the customer is a current customer, causing the client device to display the current selection indicator at the new radio button may include causing the client device to display, each time that the new radio button does not correspond to a coverage level of a current insurance policy held by the customer, (i) a current selection indicator at the new radio button, and/or (ii) a current coverage indicator at a radio button, of the respective set of radio buttons included in the control, that corresponds to the coverage level of the current insurance policy. Additionally or alternatively, causing the client device to set, each time that the customer selects a new coverage combination, the insurance premium quote to the value that corresponds to the new coverage combination may include causing the client device to set the insurance premium quote to the value that corresponds to the new coverage combination each time that the customer: (i) adjusts one or more of the plurality of controls to reflect the new coverage combination, and then (ii) requests that a quote be provided for the new coverage combination.

Additionally or alternatively, causing the client device to set, each time that the customer selects a new coverage combination, the insurance premium quote to the value that corresponds to the new coverage combination may include causing the client device to set the insurance premium quote to the value that corresponds to the new coverage combination each time that the customer adjusts a single control of the plurality of controls. Moreover, causing the client device to display a current selection indicator at the new radio button further may include causing the client device to highlight all radio buttons, in the respective set of radio buttons, starting at a radio button closest to a first end of the line within the respective control graphic and ending at the new radio button.

Additionally or alternatively, causing the client device to display a current selection indicator at the new radio button may further include causing the client device to highlight a continuous length of the line within the respective control graphic, the continuous length extending at least between (i) the radio button closest to the first end of the line, and (ii) the new radio button. Moreover, causing the client device to highlight the continuous length may include causing the client device to highlight the continuous length by adding to the control a highlight that transitions in a continuous manner from a first color at the first end of the line to a second color at a second end of the line.

Additionally or alternatively, causing the client device to provide an interactive display including a plurality of controls may include causing the client device to provide an interactive display including a plurality of touch screen controls. Moreover, causing the client device to provide an interactive display including a plurality of controls may include causing the client device to provide an interactive display including a plurality of controls usable by the customer to one or both of (i) adjust one or more deductibles of the hypothetical insurance policy, and (ii) adjust one or more coverage limits of the hypothetical insurance policy.

Additionally or alternatively, each of (i) causing the client device to provide the interactive display to the customer, (ii) causing the client device to display the current selection indicator at the new radio button, and/or (iii) causing the client device to set the insurance premium quote to the value that corresponds to the new coverage combination may include providing a set of scripting language instructions to the client device.

As yet another example, the method may further include causing, by one or more processors, the client device to provide, for each control of the plurality of controls, an additional control that, when activated by the customer, may cause the control to automatically adjust to reflect a coverage level of a current insurance policy held by the customer. Additionally or alternatively, the method may further include causing, by one or more processors, the client device to provide an additional control that, when activated by the customer, causes the plurality of controls to automatically and collectively adjust such that the plurality of controls reflects coverage levels of a current insurance policy held by the customer.

VIII. Exemplary Non-Transitory Media Embodiments

In another aspect, a tangible, non-transitory computer-readable medium stores instructions (e.g., scripting language instructions) that may, when executed by one or more processors, cause the one or more processors to cause a client device of an existing or potential customer to provide an interactive display to the customer. The interactive display may include (i) a plurality of controls usable by the customer to select different ones of a plurality of coverage combinations for a hypothetical insurance policy, and/or (ii) an insurance premium quote for the hypothetical insurance policy. The plurality of controls may include a plurality of touch screen controls, and/or may include other types of controls. Each control of the plurality of controls may (i) enable the customer to adjust coverage for a respective one of a plurality of coverage types, (ii) be associated with a respective one of a plurality of control graphics, and/or (iii) include a respective set of radio buttons distributed along a line within the respective control graphic. Each radio button in the respective set of radio buttons may correspond to a different coverage level available for the respective one of the plurality of coverage types. For example, the respective set of radio buttons may include a different radio button for every coverage level available for the respective one of the plurality of coverage types. The instructions may also cause the one or more processors to cause the client device to display, each time that the customer adjusts one of the plurality of controls by selecting a new radio button of the respective set of radio buttons, a current selection indicator at the new radio button. More specifically, in some embodiments, and if the customer is a current customer, the instructions may cause the one or more processors to cause the client device to display, each time that the new radio button does not correspond to a coverage level of a current insurance policy held by the customer, (i) a current selection indicator at the new radio button, and (ii) a current coverage indicator at a radio button, of the respective set of radio buttons included in the control, that corresponds to the coverage level of the current insurance policy. The instructions may also cause the one or more processors to cause the client device to set, each time that the customer selects a new coverage combination of the plurality of coverage combinations, the insurance premium quote to a value that corresponds to the new coverage combination. The non-transitory computer-readable medium may store instructions that direct the one or more processors to perform additional, less or alternative functionality, such as any of the functionality discussed elsewhere herein.

For instance, the instructions may also cause the client device to provide, for each control of the plurality of controls, an additional control that, when activated by the customer, causes the control to automatically adjust to reflect a coverage level of a current insurance policy held by the customer. Additionally or alternatively, the instructions may cause the one or more processors to cause the client device to provide an additional control that, when activated by the customer, causes the plurality of controls to automatically and collectively adjust such that the plurality of controls reflects coverage levels of a current insurance policy held by the customer.

IX. Additional Exemplary Methods

In one aspect, a computer-implemented method of insurance quote customization may be provided. The method may include (1) virtually displaying or graphically depicting, via a processor, (i) multiple options for an insurance policy, (ii) an initial coverage amount, limit, or deductible for each of the multiple options, and/or (iii) a periodic premium associated with the insurance policy given the initial coverage amount, limit, or deductible for each of the multiple options; (2) accepting, via the processor, a user-entered updated coverage amount, limit, or deductible for one of the multiple options; (3) calculating, via the processor, an updated periodic premium based upon the user-entered updated coverage amount, limit, or deductible for the one of the multiple options; (4) displaying, via the processor, the updated periodic premium on a display; and/or (5) simultaneously displaying, via the processor, on the display a graphical depiction or virtual representation of (a) every initial coverage amount, limit, or deductible for each of the multiple options, and (b) the user-entered updated coverage amount, limit, or deductible for the one of the multiple options to facilitate customer visualization of an impact that a user-entered change to one of the multiple options has on the periodic premium for the insurance policy. The insurance policy may be an auto insurance policy, and the multiple options for the insurance policy may include coverages, limits, and/or deductibles related to (i) bodily injury, (ii) property damage, (iii) comprehensive deductible, (iv) collision deductible, (v) uninsured motor vehicle or motorist, and/or (vi) medical payments. The method may include additional, fewer, or alternate actions, including those discussed elsewhere herein.

In another aspect, a computer-implemented method of graphically visualizing multiple insurance policy options related to an insurance policy simultaneously may be provided. The method may include: (1) displaying, via a processor, a visual depiction of multiple options for an initial insurance policy; (2) accepting, via the processor, a user-selection of an updated coverage amount for one of the multiple options; (3) updating, via the processor, the visual depiction of the multiple options to depict a customer updated insurance policy while simultaneously displaying a depiction of an initial coverage amount for the one of the multiple options that is updated by a customer via the user-selection, the customer updated insurance policy including the user-selected updated coverage amount; (4) updating, via the processor, an insurance premium for the customer updated insurance policy; and/or (5) displaying, via the processor, the updated insurance premium for the customer updated insurance policy on a display or a display screen to facilitate customer comparison of different coverage amounts for different insurance policy options that are available for an insurance policy. The insurance policy may be an auto insurance policy, and the different insurance policy options may include coverages or limits related to (i) bodily injury, (ii) property damage, (iii) comprehensive deductible, (iv) collision deductible, (v) uninsured motor vehicle or motorist, and/or (vi) medical payments. The method may include additional, fewer, or alternate actions, including those discussed elsewhere herein.

X. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of providing insurance premium quotes through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:
1. A computer-implemented method comprising:
causing, by one or more processors, a client device of a customer to provide an interactive display to the customer, the interactive display including (i) a plurality of controls usable by the customer to select different ones of a plurality of coverage combinations for a hypothetical insurance policy, and (ii) an insurance premium quote for the hypothetical insurance policy, wherein
each control of the plurality of controls (i) enables the customer to adjust coverage for a respective one of a plurality of coverage types, (ii) is associated with a respective one of a plurality of control graphics, and (iii) includes a respective set of radio buttons distributed along a line within the respective control graphic, and
each radio button in the respective set of radio buttons corresponds to a different coverage level available for the respective one of the plurality of coverage types;
causing, by one or more processors, and each time that the customer adjusts one of the plurality of controls by selecting a new radio button, of the respective set of radio buttons, that does not correspond to a coverage level of a current insurance policy held by the customer, the client device to display a current selection indicator at the new radio button,
display a current coverage indicator at a radio button, of the respective set of radio buttons included in the control, that corresponds to the coverage level of the current insurance policy, and
highlight all radio buttons, in the respective set of radio buttons, starting at a radio button closest to a first end of the line within the respective control graphic and ending at the new radio button; and
causing, by the one or more processors, the client device to set, each time that the customer selects a new coverage combination of the plurality of coverage combinations, the insurance premium quote to a value that corresponds to the new coverage combination to facilitate virtually adjusting an insurance quote.

2. The computer-implemented method of claim 1, wherein the respective set of radio buttons includes a different radio button for every coverage level available for the respective one of the plurality of coverage types.

3. The computer-implemented method of claim 1, wherein causing the client device to set, each time that the customer selects a new coverage combination, the insurance premium quote to the value that corresponds to the new coverage combination includes:
causing the client device to set the insurance premium quote to the value that corresponds to the new coverage combination each time that the customer (i) adjusts one or more of the plurality of controls to reflect the new coverage combination, and then (ii) requests that a quote be provided for the new coverage combination.

4. The computer-implemented method of claim 1, wherein causing the client device to set, each time that the customer selects a new coverage combination, the insurance premium quote to the value that corresponds to the new coverage combination includes:
causing the client device to set the insurance premium quote to the value that corresponds to the new coverage combination each time that the customer adjusts a single control of the plurality of controls.

5. The computer-implemented method of claim 1, wherein causing the client device to highlight all radio buttons starting at the radio button closest to the first end of the line includes:
causing the client device to highlight a continuous length of the line within the respective control graphic, the continuous length extending at least between (i) the radio button closest to the first end of the line and (ii) the new radio button.

6. The computer-implemented method of claim 5, wherein causing the client device to highlight the continuous length includes causing the client device to highlight the continuous length by adding to the control a highlight that transitions in a continuous manner from a first color at the first end of the line to a second color at a second end of the line.

7. The computer-implemented method of claim 1, wherein causing the client device to provide an interactive display including a plurality of controls includes causing the client device to provide an interactive display including a plurality of touch screen controls.

8. The computer-implemented method of claim 1, wherein causing the client device to provide an interactive display including a plurality of controls includes causing the client device to provide an interactive display including a plurality of controls usable by the customer to one or both of (i) adjust one or more deductibles of the hypothetical policy, and (ii) adjust one or more coverage limits of the hypothetical policy.

9. The computer-implemented method of claim 1, wherein each of causing the client device to provide the interactive display to the customer, causing the client device to display the current selection indicator at the new radio button, and causing the client device to set the insurance premium quote to the value that corresponds to the new coverage combination includes:
providing a set of scripting language instructions to the client device.

10. The computer-implemented method of claim 1, further comprising:
causing, by one or more processors, the client device to provide, for each control of the plurality of controls, an additional control that, when activated by the customer, causes the control to automatically adjust to reflect a coverage level of a current insurance policy held by the customer.

11. The computer-implemented method of claim 1, further comprising:
causing, by one or more processors, the client device to provide an additional control that, when activated by the customer, causes the plurality of controls to automatically and collectively adjust such that the plurality of controls reflects coverage levels of a current insurance policy held by the customer.

12. A tangible, non-transitory computer-readable medium storing instructions that, when executed by one or more processors, cause the one or more processors to:
cause a client device of a customer to provide an interactive display to the customer, the interactive display including (i) a plurality of controls usable by the customer to select different ones of a plurality of coverage combinations for a hypothetical policy, and (ii) an insurance premium quote for the hypothetical policy, wherein
each control of the plurality of controls (i) enables the customer to adjust coverage for a respective one of a plurality of coverage types, (ii) is associated with a respective one of a plurality of control graphics, and (iii) includes a respective set of radio buttons distributed along a line within the respective control graphic, and
each radio button in the respective set of radio buttons corresponds to a different coverage level available for the respective one of the plurality of coverage types;
cause, each time that the customer adjusts one of the plurality of controls by selecting a new radio button, of the respective set of radio buttons, that does not correspond to a coverage level of a current insurance policy held by the customer, the client device to
display a current selection indicator at the new radio button,
display a current coverage indicator at a radio button, of the respective set of radio buttons included in the control, that corresponds to the coverage level of the current insurance policy, and
highlight all radio buttons, in the respective set of radio buttons, starting at a radio button closest to a first end of the line within the respective control graphic and ending at the new radio button; and
cause the client device to set, each time that the customer selects a new coverage combination of the plurality of coverage combinations, the insurance premium quote to a value that corresponds to the new coverage combination.

13. The tangible, non-transitory computer-readable medium of claim 12, wherein the respective set of radio buttons includes a different radio button for every coverage level available for the respective one of the plurality of coverage types.

14. The tangible, non-transitory computer-readable medium of claim 12, wherein the plurality of controls include a plurality of touch screen controls.

15. The tangible, non-transitory computer-readable medium of claim 12, wherein the instructions further cause the one or more processors to:
- cause the client device to provide, for each control of the plurality of controls, an additional control that, when activated by the customer, causes the control to automatically adjust to reflect a coverage level of a current insurance policy held by the customer; and
- cause the client device to provide an additional control that, when activated by the customer, causes the plurality of controls to automatically and collectively adjust such that the plurality of controls reflects coverage levels of a current insurance policy held by the customer.

* * * * *